Jan. 11, 1949. C. A. CONKLIN 2,458,931
CONVERTIBLE KNOCKDOWN GARDEN TRELLIS
Filed Feb. 20, 1945 2 Sheets-Sheet 1
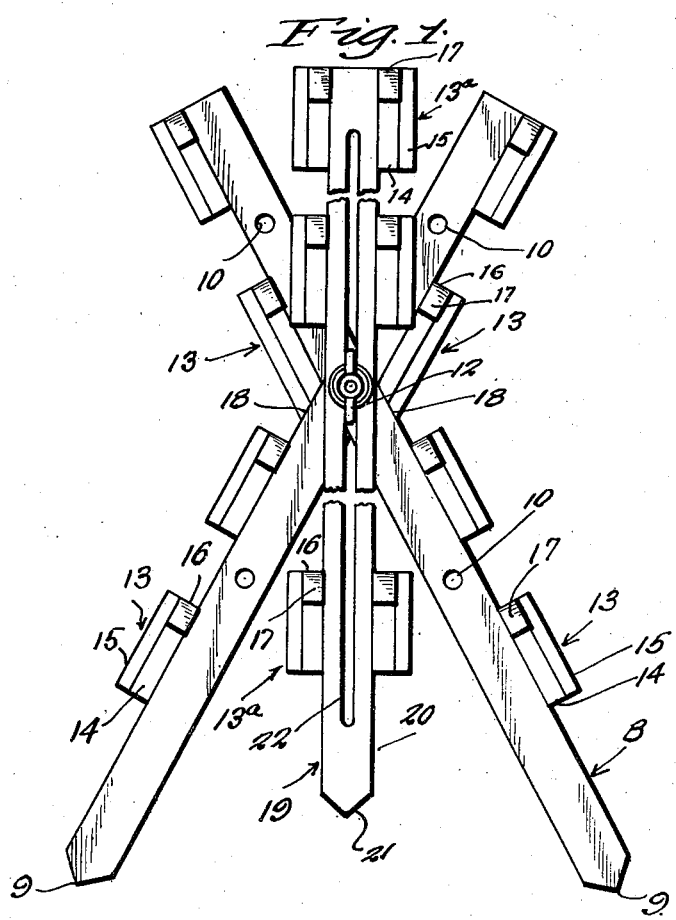
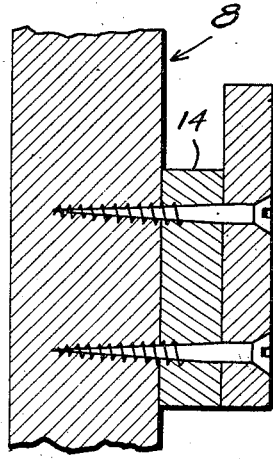
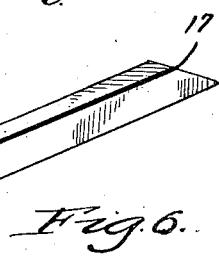
Inventor
Clarence A. Conklin,
By *Clarence A. O'Brien
and Harvey B. Jackson*
Attorneys Jan. 11, 1949.   C. A. CONKLIN   2,458,931
CONVERTIBLE KNOCKDOWN GARDEN TRELLIS
Filed Feb. 20, 1945   2 Sheets-Sheet 2
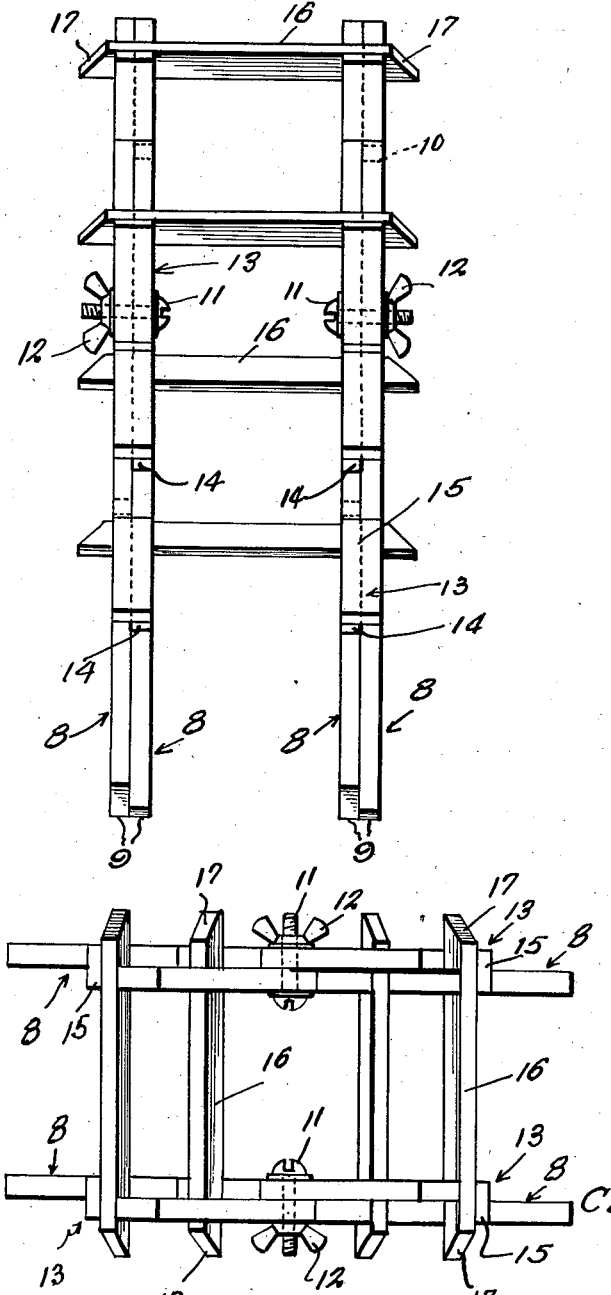
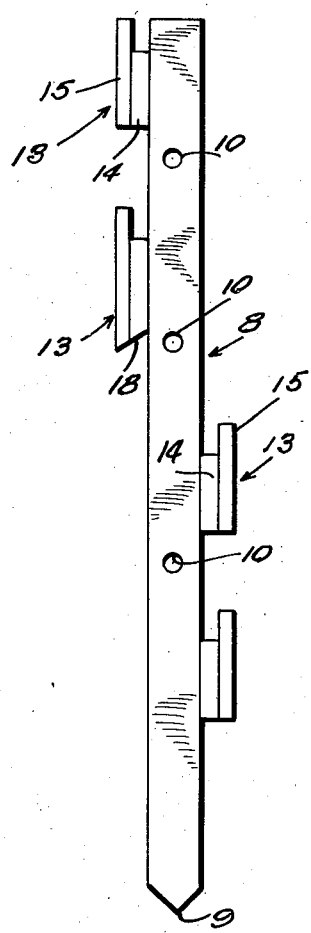
Inventor
Clarence A. Conklin, Patented Jan. 11, 1949

2,458,931

UNITED STATES PATENT OFFICE 2,458,931

CONVERTIBLE KNOCKDOWN GARDEN TRELLIS

Clarence A. Conklin, Northport, N. Y.

Application February 20, 1945, Serial No. 578,804

1 Claim. (Cl. 47—44).

This invention relates to a novel knock-down convertible-type trestle or trellis-work for use in gardens as practicable and feasible supporting means for plants and vines of so-called climbing and creeping varieties.

Satisfactorily adaptable to and for use on farms and in gardens, the form of the invention comprehended is susceptible of simple and expedient erection and adjustment, is devoid of strings and nails, and of such construction and design as to enable the user to raise at least one-third more on one-third less ground space than is possible with present day makeshift sticks and stakes, and in addition, the arrangement is such as to promote unimpeded spraying and caring for plants and flowers and is useful in divers ways such as can best be appreciated by gardeners and the like.

Furthermore, experimentation by trial and error has enabled me to provide a device of the type herein shown and described which is readily convertible and adjustable, compact and convenient and such that it accommodates both dwarf and high-climbing varieties of plants and flowers, serves to promote the growth of cleaner vegetables, minimizes the amount of fertilizers required, and beautifies the garden in which it is set up for use.

In carrying out the principles of the invention, I have adopted standardized leg frame units which serve as end frames for the complete trestle, the legs being adapted to be adjustably connected in pairs and being provided on their outer edges with properly spaced and arranged cleats serving as keepers for horizontal stringers or rails, the latter adjoining the complemental pairs of end frames in erected positions.

I also contemplate the provision of vertically extensible attachments for the so-called end frames, these also provided with cleats, similar to those on the legs, to accommodate additional rails, the attachments serving handily and suitably to accommodate high-climbing pole beans.

Other features and advantages will become more readily apparent from the following description and the accompanying illustrative drawings.

In the drawings, wherein like numerals are employed to designate like parts throughout the views:

Figure 1 is an end elevation of the trellis-like trestle constructed in accordance with the principles of the instant invention, the extensible attachment being shown connected thereto.

Figure 2 is a side elevational view of the structure seen in Figure 1 with the extensible attachment removed.

Figure 3 is a top plan view of the structure seen in Figure 2.

Figure 4 is a detail elevational view of one of the legs.

Figure 5 is an enlarged fragmentary view showing the construction of the preferred type of keeper-forming cleat.

Figure 6 is a perspective view of one of the so-called stringers or rails.

By way of introduction to the detailed description, it is to be explained that the unitary structure, picturing it as a knock-down and convertible framework, may be described, it is believed, either as a trestle or trellis, or both. It is usually referred to as a trellis in connection with flowers and as a trestle when used in connection with climbing plants and vines. It is sufficient, perhaps, to refer to it as a knock-down convertible trestle with or without the attachments seen in Figure 1.

Referring now to the drawings by distinguishing reference numerals, it will be seen that each end frame, as a unit, is made up of a pair of duplicate complemental legs, each leg being denoted by the numeral 8. As seen in Figure 4, the leg is of appropriate material and length, and the lower end thereof is pointed, as at 9, this to penetrate the ground. It is provided at suitable points with bolt holes 10 to accommodate the connecting and adjusting bolts 11, these provided with wing-type clamping nuts 12. The cleats are in pairs and are individually denoted by the numerals 13. That is to say, I provide a pair of cleats on each longitudinal edge of each leg, as shown in Figure 4. Each cleat comprises an inner block 14 and an outer companion block 15, the latter extending above the upper edge of the block 14 to form a sort of a seat, that is, a keeper seat for the coacting end of a stringer or rail 16 (see Fig. 6). The ends of the rails are preferably beveled, as at 17. By beveling the ends and properly arranging a plurality of these stringers in end-to-end relationship with the bevels coacting, it is possible to erect a "running fence" actually made up of a series of trestles. I also direct attention to the fact that the cleats adjacent the central bolt holes 10 (see Fig. 1) are preferably beveled, as indicated at 18, the bevels resting on the adjacent edges of the coacting legs when the legs are assembled.

In practice, the legs 8 are arranged in pairs and are bolted together in separable intersecting relationship whereby to form an X-shaped end frame. It is, of course, possible to use this end frame alone or to employ two end frames at longitudinally spaced points, as shown in Figure 2, and to connect these together by a plurality of stringers or rails 16. In other words, by setting up two end frames in X-shaped form and setting the legs properly, and by placing the rails in the proper keeper seats, a complete trestle is thus provided.

The invention also contemplates, as before indicated, the inclusion of an extension attachment. The attachment is shown in Figure 1 and is denoted by the numeral 19. It comprises a wooden or equivalent bar 20 of suitable dimensions having its lower end pointed to enter the ground, and having its intermediate portion provided with a longitudinal slot 22 to accommodate the bolt and nut connecting means, as shown in the drawings. Thus, the attachment can be connected to one of the end frames and adjusted up and down in relation to said end frame. This attachment is also provided with cleats 13a constructed precisely the same as the aforementioned cleats 13. The cleats here are arranged on opposite longitudinal edges and are adapted to accommodate the tie rails or stringers 16.

Novelty is thought to reside in the parts singly and collectively. That is to say, the single leg seen in Figure 4 is pointed at its lower end and provided on opposite sides with pairs of keeper-forming cleats to adapt it for use in the construction of an end frame, and is an improvement in itself. In addition, the X-shaped end frames which go to form supports for the ends of the trestles as a whole are believed to be novel. That is to say, the use of pairs of crossed pivotally connected legs with cleats forming end frames is a novel contribution to the art.

The idea of using the adjustable, knock-down, X-shaped end frame and the interconnecting and assembling rails, the latter usable in desired numbers and groups, is an added improvement. What is more, I desire to stress the adoption and use of the attachment means 19, these attachments being detachable and raisable and lowerable to accommodate dwarf plants as well as high-climbing pole beans. The claims are worded and presented accordingly.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

A plant supporting trestle comprising in combination, a pair of upright end frames disposed in spaced parallel relation and each comprising a pair of crossed legs pivotally connected together at the intersection thereof, a plurality of blocks secured to the outer edge surfaces of said legs, said blocks being formed in the upper edge portions thereof with notches, said notches coacting with the adjacent surfaces of said legs to form keeper seats, and a plurality of stringers positioned in said seats and connecting said end frames together, a pair of said blocks on each frame being disposed adjacent the intersection of said legs and being provided at the lower edges thereof with undercut, bevel surfaces, one of said undercut blocks being provided on each of said legs and the bevel surface thereof being engageable with the outer edge surface of the adjacent leg, whereby said legs may be prevented from excessive spreading.

CLARENCE A. CONKLIN.

REFERENCES CITED

The following references are of record in the file of this patent:

UNITED STATES PATENTS

| Number | Name | Date |
|---|---|---|
| 11,153 | Cross | June 27, 1854 |
| 129,385 | Winship | July 16, 1873 |
| 356,139 | Knox | Jan. 18, 1887 |
| 841,058 | Sherlock | Jan. 8, 1907 |